Nov. 28, 1939.   C. L. CHATHAM   2,181,392
DEAD-END CABLE GRIPPING DEVICE
Filed Aug. 20, 1937   2 Sheets-Sheet 1
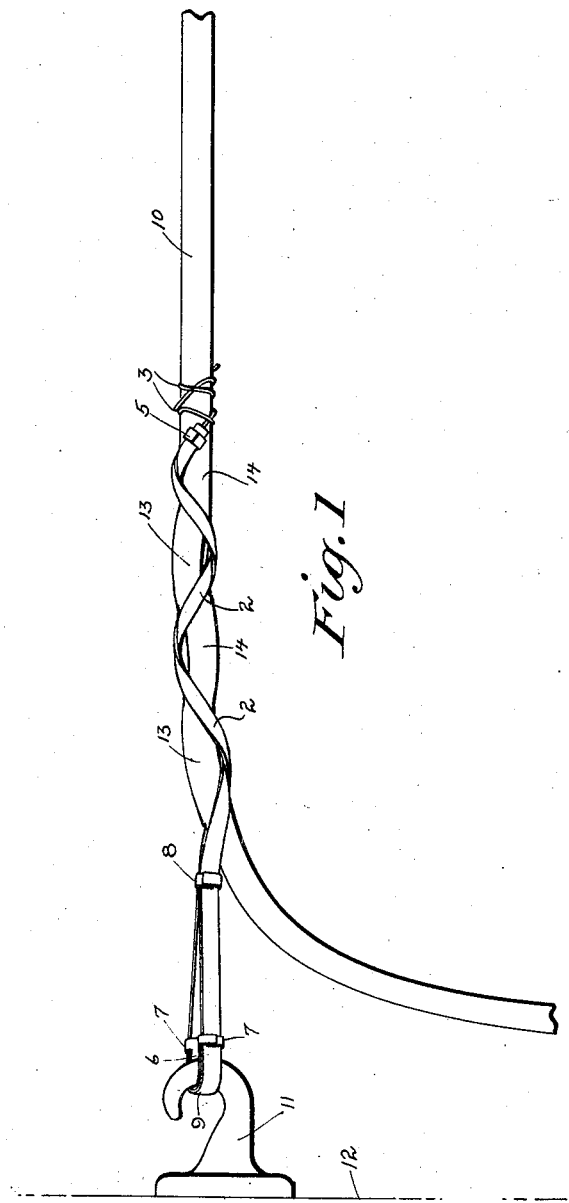
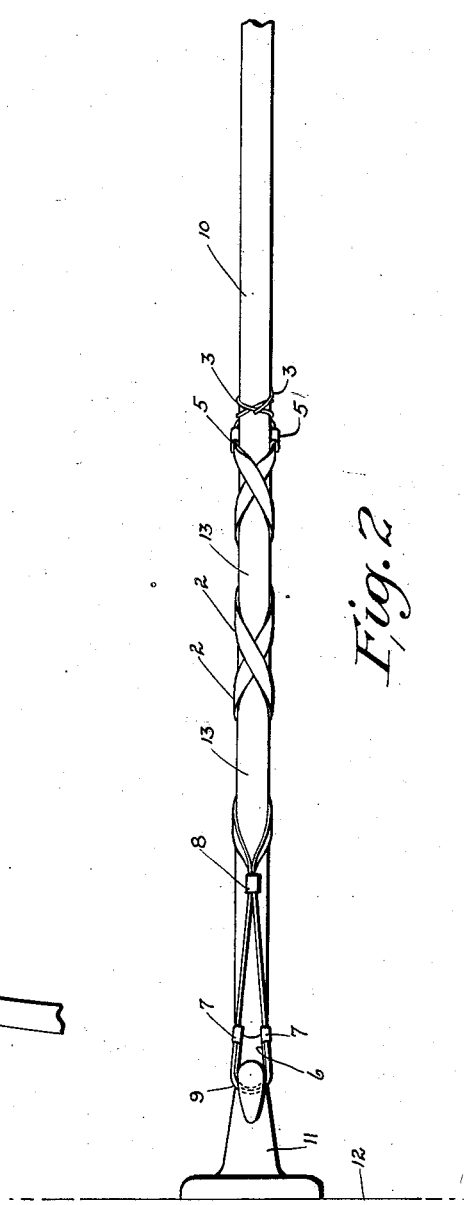
INVENTOR.
Clyde L. Chatham
BY
Chester W. Brown
ATTORNEY.

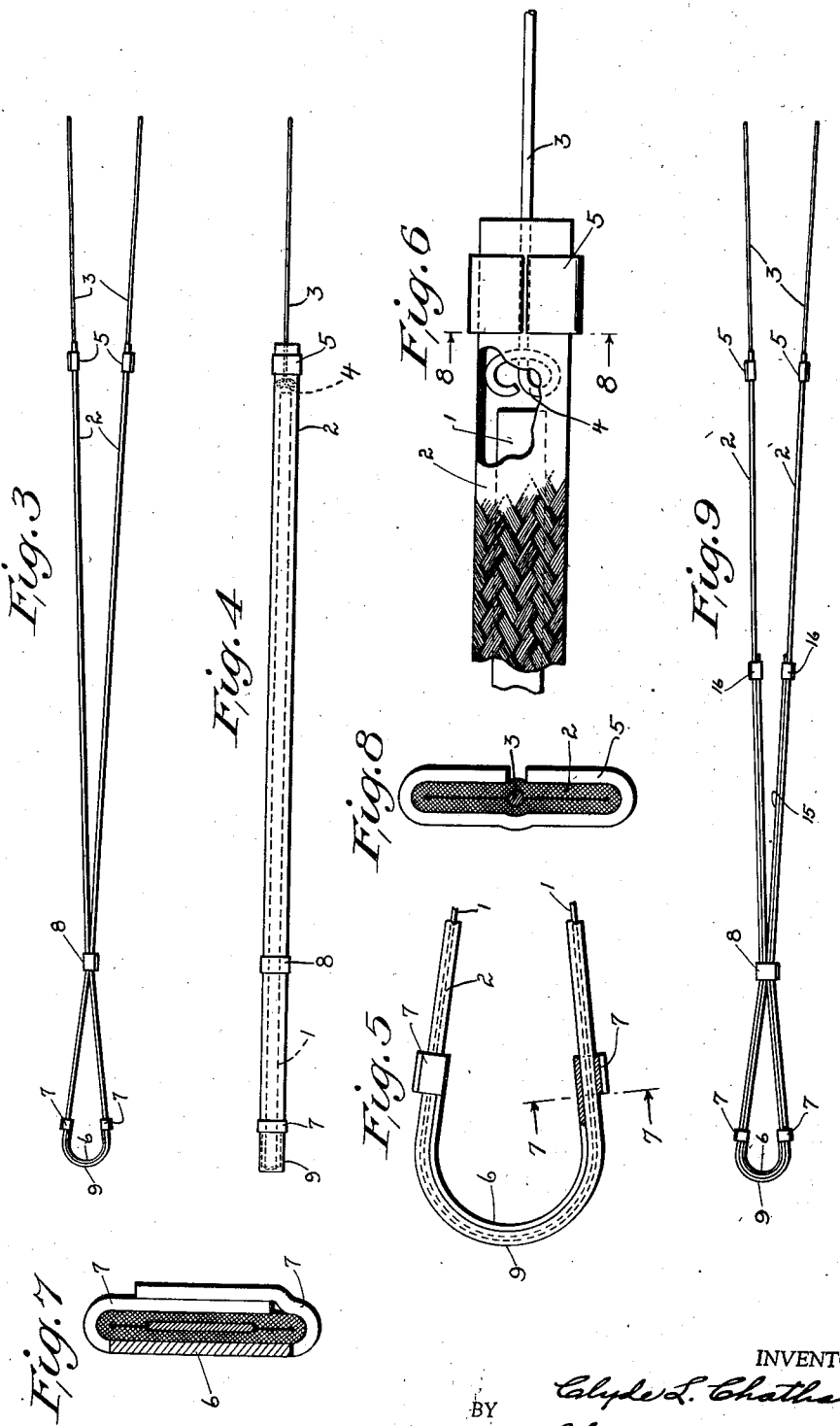

Patented Nov. 28, 1939

2,181,392

UNITED STATES PATENT OFFICE 2,181,392

DEAD-END CABLE GRIPPING DEVICE

Clyde L. Chatham, Nutley, N. J., assignor to Line Material Company, South Milwaukee, Wis., a corporation of Delaware Application August 20, 1937, Serial No. 160,050

12 Claims. (Cl. 24—115)

This invention relates to improvements in dead-end cable gripping devices.

The primary object is to provide a dead-end cable gripping device which will automatically adjust itself to prevent excessive increase in tension exerted by a cable upon a support at the dead end thereof and which will beyond the limits of its adjustability release the cable, thereby avoiding injury to a support for the cable.

Another object of this invention is to provide for an electrical cable a dead-ending device which will grip the cable with a force comprehensive with the tension produced by the cable.

Specifically, it is an object to provide a flat flexible ribbon-like wire braid looped intermediate its ends for attachment to a support and having its end portions extending from the loop and each adapted to be freely wound about the dead-end portion of a cable in a spiral path opposed to the spiral path of the other end portion, the ends of the braid being secured together when so wound, whereby a pulling force exerted upon the strip by the cable will cause the spirally wrapped portions of strip to firmly and non-slidably grip the cable.

Another object is to provide a dead-end cable gripping strip which is strong, efficient, comparatively cheap to manufacture, easily manipulated, and requires no special skill in applying it to a cable, and which can be readily attached to an unsevered length of cable which extends to points remote from the gripping strip.

A further object is to provide a dead-end cable gripping device comprising a flat strip of braided wire adapted to be wound around an insulated cable and including a large number of strands of relatively fine wires which give, in effect, a roughened gripping surface with closely spaced and relatively small cooperating ridges, whereby the strands will bite the surface of the cable insulation without injury to the body thereof.

In the drawings:

Fig. 1 is a view in side elevation showing an embodiment of this invention as applied to a cable.

Fig. 2 is a top plan view of parts shown in Fig. 1.

Fig. 3 is a top plan view of the cable gripping strip as it appears before it is applied to a cable.

Fig. 4 is a view in side elevation of the device shown in Fig. 3.

Fig. 5 is an enlarged fragmentary view of the support-engaging end of the strip, partly in section.

Fig. 6 is an enlarged fragmentary view in side elevation, partly in section, of one end of the strip.

Fig. 7 is a sectional view taken on the line 7—7 of Fig. 5.

Fig. 8 is a sectional view taken on the line 8—8 of Fig. 6.

Fig. 9 is a view similar to Fig. 3 showing a modified form of this invention.

Like parts are identified by the same reference characters throughout the several views.

The embodiment of the gripping device shown in Figs. 1 to 8, inclusive, comprises an inner reinforcing wire or flat metal strip 1, a hollow metal braid 2 which surrounds and is flattened to conform to the strip 1, anchoring or tie wires 3 projecting from the inside of the braid 2 and looped at 4 to provide anchoring means rendered operative by means of the clips 5 clamped upon the braid ends, yoke member 6 having at its ends ears 7 crimped about the braid, and clip 8 crimped about the adjacent portions of the braid at a point remote from yoke member 6 to provide a closed loop embracing the yoke member 6.

Figs. 1 and 2 show the gripping device applied to an insulated cable 10. The loop 9 of the anchoring device is hooked over the supporting hook 11 secured in any suitable manner, not shown, to a supporting surface which is illustrated diagrammatically by the line 12. The ends of the braid which project from the loop 9 and beyond the clip 8 are wound spirally about the cable 10, each being disposed in a spiral path opposed to the spiral path of the other. When the braid 2 has been wrapped, as indicated in the drawings, the wires 3 are likewise wrapped about the cable 10 and secured together so that they firmly engage the cable 10 and cause the wrapped portions of the braid 2 to be drawn taut and in maximum frictional engagement with the cable 10 when the latter exerts a tension thereon.

Preferably the braid 2 comprises a plurality of small wires braided together to form a tubular structure which is flattened after the strip 1 is inserted. As a consequence, the braid 2 is elongated when subjected to tension and the portions which are wrapped about the cable 10 are drawn into firm frictional contact therewith. In order to render the device as flexible as possible, the strip 1 is substantially non-resilient and therefore readily conforms to the contour of the cable 10.

Another feature which should be noted is the fact that the braid not only clamps the cable between spirally wound portions, but that it tends to cause and does actually cause an axial distortion or displacement of portions 13 and 14 of the cable 10, the direction of displacement of the portions 13 being opposite to the direction of displacement of the portions 14. Thus, the cable 10 is to a degree undulated by the gripping device between the contacting portions of the spirals and serves to render the gripping action more effective by effecting a snubbing action and resisting slippage of the device longitudinally of the cable.

The degree of elongation of the braid 2 under the influence of tension produced by the cable 10 may be predetermined by the choice of the kind and number of wires of the braid. Tests have indicated that for a device of given overall dimensions, a braid composed of wires of given size will be elongated less than a braid composed of wires of smaller size, and will resist greater stresses without damage to the latter. Consequently, the gripping device may be accurately designed for use with cables of any given size.

Furthermore, the ultimate strength of gripping may be predetermined by given over-all dimensions such as by the width of the braid, the length of the portions which are wrapped about the cable, and dimensions of the strip 1 within the braid.

The dead ends of cables are frequently supported from rigid house brackets which, due to inherent weakness of the structures supporting them, cannot withstand excessive strains. Such strains, in many cases, are caused by movement of the poles supporting the cables at points remote from the brackets. There are various reasons for pole movements, but whatever they are, the effects upon the structures supporting the brackets are in many cases highly undesirable.

The merits of the invention disclosed herein will be appreciated when it is realized that it minimizes the stresses which are transmitted through a cable from a pole to the bracket supporting the dead end of the cable. As previously described, the gripping device includes a flexible braid 2 which elongates under the influence of tension in the cable 10. Consequently, if a pole (not shown) pulls the cable 10 in a direction extending from the bracket 11, the braid 2 will elongate and the elongation of the braid may continue to a point of ultimate strength for which it is designed. Obviously, the extent to which the braid is elongated will depend entirely upon the tension exerted by the cable.

Although I have specifically described and shown the cable gripping device in use with an overhead electric cable, it will be understood that there are many other situations where the device may be utilized in a similar manner but not in overhead electric lines.

The modified form of cable gripping device shown in Fig. 9 is in structure and operation much like that previously described. However, the braid 2 is tubular, as shown in Figs. 5, 6, 7 and 8, and is reinforced by a shorter similar braid member 15 positioned within the loop 9 and between the loop 9 and yoke member 6 and extending to points remote from the clip 8 defining the loop where the ends of the braid member 15 are each attached to the braid 2 by means of a clip 16.

The braid member 15 materially increases the strength of the gripping device due in part to the fact that the braid 2 grips the member 15 to the yoke 6 and also grips that portion of the member 15 between the clip 8 and the clips 16 to a cable.

The member 15 may, if desired, be coextensive in length with the braid 2. However, as previously suggested, the member 15 is preferably shorter than the braid 2, but is sufficiently long to be placed in gripping engagement with a cable. It has been found that considerable manufacturing cost is saved when the member 15 is shorter than the braid 2 without sacrificing cable gripping efficiency. This efficiency is believed to be maintained because of the fact that those portions of the braid 2 extending beyond the member 15 are more easily flexed into gripping contact with a cable than they would be if the member 15 and the braid 2 were of the same length.

Although the modified gripping device shown in Fig. 9 is not illustrated as applied to a cable, it is believed that this will be readily understood from the disclosure in Figs. 1 and 2.

It is contemplated that after a predetermined elongation of the gripping device as previously noted, the braid 2, and, under some circumstances, the strip 1, will break and release the cable 10 before serious injury occurs to the supporting structure 12. However, I do not wish to have the claims limited to this feature, unless specifically so stated.

It will be obvious that a cable gripping device has been provided which comprises a flexible braid having a large number of cooperating cable gripping ridges that bite into the insulation of a cable without injury to the body of the insulation.

It will be apparent that a dead-end cable gripping device has been provided which will yield under predetermined loads and prevent injury to a supporting structure, which will increase its grip upon a cable as the cable increases the tension upon a supporting structure, which will rupture and release the cable at a predetermined load, and which is efficient, comparatively simple and easily manipulated.

I claim:

1. A cable gripping device for attaching the dead end of a cable to a support, said device including a length of braid having the form of a loop intermediate its ends, a flexible substantially non-extensible yoke member secured to said braid and disposed within said loop, a clip securing adjacent portions of said braid together to form said loop, and a pair of anchoring wires each secured to one of said ends.

2. A cable gripping device for attaching the dead end of a cable to a support, said device including a flat flexible strip, a tubular braid covering said strip and conforming to the shape thereof, said strip and braid having the form of a closed loop intermediate their ends, and means for securing the ends of said braid together.

3. A cable gripping device for attaching the dead end of a cable to a support, said device including a flat flexible strip, a tubular braid covering said strip and conforming to the shape thereof, said strip and braid having the form of a closed loop intermediate their ends, means for securing the ends of said braid together, said means comprising a pair of anchoring wires each extending into an end of said braid, and clips securing said wires to said braid.

4. A cable gripping device for attaching the dead end of a cable to a support, said device including a flat flexible strip, a tubular braid covering said strip and conforming to the shape thereof, said strip and braid having the form of a closed loop intermediate their ends, a yoke member within and secured to said loop, and means for securing the ends of said braid together.

5. A cable gripping device for attaching the dead end of a cable to a support, said device including a flat flexible strip, a tubular braid covering said strip and conforming to the shape thereof, said strip and braid having the form of a closed loop intermediate their ends, a yoke member within and secured to said loop, means for securing the ends of said braid together, said means comprising a pair of anchoring wires each extending into an end of said braid, and clips securing said wires to said braid.

6. A cable gripping device for attaching the dead end of a cable to a support, said device including a flat flexible strip, a tubular braid covering said strip and conforming to the shape thereof, said strip and braid having the form of a closed loop intermediate their ends, a yoke member within and secured to said loop, a pair of anchoring wires each having a looped portion positioned within an end of said braid, and clips secured to said braid and holding said wires against withdrawal from said ends.

7. A cable gripping device for attaching the dead end of a cable to a support, said device including a first length of braid, a second length of braid secured to the first length of braid, said braids having the form of a closed loop, a yoke within said loop and secured thereto, said second length of braid extending between said yoke and said first length of braid, and anchoring means at the ends of the first length of braid.

8. A cable gripping device for attaching the dead end of a cable to a support, said device including a first length of braid, a second length of braid secured to the first length of braid, said braids having the form of a closed loop, a yoke within said loop and secured thereto, said second length of braid extending between said yoke and said first length of braid, anchoring means at the ends of the first length of braid, said first length of braid being tubular, and a flexible reinforcing wire within said first length of braid.

9. A cable gripping device comprising an elongated flat flexible tubular member made of braided wire, a strip of flexible metal disposed within said member intermediate the ends thereof, said member and strip forming a closed loop, a clip embracing adjacent portions of said loop, said member including portions extending beyond said loop and adapted for encircling a cable, and a pair of tie wires each secured to the end of one of said portions.

10. A cable gripping device comprising an elongated flat flexible tubular member made of braided wire, a strip of flexible metal disposed within said member intermediate the ends thereof, said member and strip forming a closed loop, a clip embracing adjacent portions of said loop, said member including portions extending beyond said loop and adapted for encircling a cable, a pair of tie wires each extending into an end of one of said portions and looped therein, and a clip secured to each of said portions to retain the looped portions of said tie wires within said cable encircling portions.

11. A cable gripping device comprising an elongated flat flexible tubular member made of braided wire, a strip of flexible metal disposed within said member intermediate the ends thereof, said member and strip forming a closed loop, a clip embracing adjacent portions of said loop, said member including portions extending beyond said loop and adapted for encircling a cable, and a yoke member within said loop comprising a flat strip of metal having its ends clipped about portions of said loop.

12. A dead-end cable grip comprising a flat tubular braided wire having its intermediate portion in the form of a loop and its remaining portions integral with and extending from said loop and adapted to be wound about a cable, and a flexible extension on each of said remaining portions adapted for anchoring the ends of said portions to a cable.

CLYDE L. CHATHAM.